United States Patent [19]
Atkinson

[11] Patent Number: 5,490,413
[45] Date of Patent: Feb. 13, 1996

[54] METHOD AND APPARATUS FOR DETECTING REFRIGERANT LEAKS

[76] Inventor: John A. Atkinson, 35B George Street, Guelph, Ontario, Canada, N1H 1S5

[21] Appl. No.: 180,977

[22] Filed: Jan. 14, 1994

Related U.S. Application Data

[63] Continuation of Ser. No. 708,195, May 31, 1991, Pat. No. 5,301,537.

[51] Int. Cl.$^6$ .................................................. G01M 3/04
[52] U.S. Cl. .................................................................. 73/40
[58] Field of Search ........................ 73/40.7, 40, 31.05; 324/464, 468; 250/281, 282

[56] References Cited

U.S. PATENT DOCUMENTS

| | | | |
|---|---|---|---|
| 2,504,772 | 4/1950 | White | 175/183 |
| 2,550,498 | 4/1951 | Rice | 175/183 |
| 2,591,485 | 4/1952 | White | 175/183 |
| 2,652,532 | 9/1953 | Zemany | 324/33 |
| 2,742,585 | 4/1956 | Zemany | 313/7 |
| 2,795,716 | 6/1957 | Roberts | 313/7 |
| 2,806,991 | 9/1957 | White | 324/33 |
| 2,814,018 | 11/1957 | Zemany | 324/33 |
| 2,897,437 | 7/1959 | Briggs et al. | 324/33 |
| 2,934,694 | 4/1960 | Vacca | 324/33 |
| 2,996,661 | 8/1961 | Roberts | 324/468 |
| 3,071,722 | 1/1963 | Roberts | 324/33 |
| 3,076,139 | 1/1963 | Roberts | 324/33 |
| 3,329,008 | 7/1967 | Roberts | 73/40.7 |
| 3,363,451 | 1/1968 | Roberts | 73/40.7 |
| 3,471,746 | 10/1969 | Roberts | 315/111 |
| 3,578,758 | 5/1971 | Altshuler | 73/40.7 |
| 3,803,481 | 4/1974 | Compton et al. | 324/33 |
| 3,867,631 | 2/1975 | Briggs et al. | 73/40.7 |
| 3,999,065 | 12/1976 | Briggs | 250/281 |
| 4,053,825 | 10/1977 | Young | 324/33 |
| 4,609,875 | 9/1986 | Jeffers | 324/455 |
| 4,758,366 | 7/1988 | Parekh | 73/40.7 |
| 4,785,666 | 11/1988 | Bergquist | 73/40.7 |
| 4,877,584 | 10/1989 | Yates, Jr. et al. | 324/468 |
| 4,896,529 | 1/1990 | Tonelli et al. | 73/40.7 |
| 4,910,463 | 3/1990 | Williams, II et al. | 324/468 |
| 5,053,343 | 10/1991 | Vora et al. | 324/468 |

FOREIGN PATENT DOCUMENTS

| 219557 | 9/1989 | Japan | 73/23.37 |
|---|---|---|---|

OTHER PUBLICATIONS

Inficon A Leybold–Heraeus Company "IPC–50 Mobile Sampling System Technical Manual" Sep., 1985.
Inficon A Leybold–Heraeus Company "The Quadrex 200 Residual Gas Analyzer Manual" Nov., 1985 pp. i to iv–xx.

*Primary Examiner*—Hezron E. Williams
*Assistant Examiner*—Nashmiya Ashraf
*Attorney, Agent, or Firm*—Ridout & Maybee

[57] ABSTRACT

Detection of leakages of refrigerant from compressor-evaporator-condenser circuits is carried out with an electron multiplier equipped mass spectrometer of which the evacuated detector chamber is maintained at substantially constant elevated temperature in the range about 60 to about 130° C. This allows high gain settings to be employed allowing detection of very small leakage rates by direct sampling from the ambient atmosphere while distinguishing from chemically analogous halogenated hydrocarbons used as blowing agents for foamed insulation and present in substantial concentrations in the ambient atmosphere.

7 Claims, 3 Drawing Sheets

METHOD AND APPARATUS FOR DETECTING REFRIGERANT LEAKS

This is a continuation of application Ser. No. 07/708,195, filed May 31, 1991, now U.S. Pat. No. 5,301,537.

BACKGROUND OF THE INVENTION

The present invention relates to a method and us for detection of leakage of refrigerants from equipment such as freezers, refrigerators, air conditioners, dehumidifiers and like equipment having compressor-evaporator-condenser circuits containing a refrigerant as the working fluid. Usually, the refrigerant is a halogenated hydrocarbon.

It is desirable during the course of manufacture of such equipment to test for leakage of the refrigerant from the compressor-evaporator-condenser circuit, since, firstly, leakage of the refrigerant affects the durability and service life of the equipment, and, secondly, many commonly used refrigerants are considered to pollute the atmosphere and to play a part in the depletion of the earth's ozone layer.

Halogen sniffers have been used to test for leakages. Halogen sniffers, however, have quite limited sensitivity and under usual operating conditions are not capable of detecting very small rates of refrigerant leakage, of less than about ½ oz per year ($9 \times 10^{-5}$ std. atm cc/sec) FREON-12 (trademark), for example. Moreover, halogen sniffers are usually sensitive to smoke and solvent vapours and, in addition, the ambient air in the manufacturing plant often contains substantial concentrations of halogenated hydrocarbon chemically different from the refrigerant compound, since halogenated hydrocarbons are commonly used as blowing agents in the foamed insulation present in refrigerators, freezers and the like. The halogen sniffers are incapable of distinguishing between different halogenated compounds and are therefore not effective in detecting a leak of one halogenated hydrocarbon in an ambient atmosphere containing another halogenated hydrocarbon. To avoid this problem, refrigerators, freezers, etc. have been warehoused for approximately one week after manufacture in order to allow out-gassing of blowing agents from the foamed insulation before subjecting the equipment to leakage testing using halogen sniffers. The costs of storage and the need to maintain a large inventory of finished equipment before it can be shipped have added significantly to the costs of manufacturing of the equipment.

U.S. Pat. No. 3,578,758 (Altshuler) and U.S. Pat. No. 4,785,666 (Berquist) disclose methods for the detection of leaks from electronic components such as encapsulated semiconductor devices using a tracer gas, normally helium, using a mass spectrometer. As is well understood by those skilled in the art, a mass spectrometer ordinarily comprises an elongated evacuated detector chamber having at one end an ionizer at which the molecules of a sample introduced into the detector chamber are ionized. Several methods of ionization are known to those skilled in the art. Ordinarily, ionization is accompanied by fragmentation of the molecules. At an opposite end of the chamber an ion detector is located. Means are provided for accelerating the ions (of whole molecules or of molecular fragments) from the ionizer toward the detector, and mass analyzer means are provided for separating ions from the path between the ionizer and the detector selectively according to mass, so that ions falling within a predetermined mass range are incident on the ion detector. In this manner, a signal can be obtained indicative of the abundance of ions or ion fragments of selected mass within the detector chamber. The greater the resolution of the spectrometer the narrower the mass range may be. Again various ion acceleration means, mass analyzer means and detection means are known to those skilled in the art. It is also known that in order to achieve the greatest sensitivity, an ion detector may comprise an electron multiplier which amplifies the current resulting from the impingement of the ions.

In the past, the composition of the gases analyzed in mass spectrometers has been carefully controlled. For example, in the Altshuler U.S. Pat. No. 3,578,758, an electronic component to be tested for leakage is first impregnated with tracer gas such as helium, and care is taken to exclude moisture and other contaminants by placing the impregnated test component in a sealed test container which is evacuated and purged with an inert dry purging gas such as nitrogen before the detector chamber of the mass spectrometer is connected to it. The mass spectrometer is adjusted to be responsive to helium and non-responsive to nitrogen, so that a signal from the mass spectrometer indicates leakage of helium from the component under test. In the Berquist U.S. Pat. No. 4,785,666 the procedure differs in that the sealed test container is purged with nitrogen at atmospheric pressure and a needle valve probe may be used to sample the gas in the test container adjacent the container undergoing test. In Berquist, the test container is preferably less than 5 ccs in volume. As will be appreciated, it would be impracticably expensive to charge large pieces of equipment such as refrigeration equipment, which have a large capacity of working fluid or refrigerant, with helium or other inert gas and it would be impracticable to maintain such equipment, which may be five or six feet in its longest external dimension, in a test container purged with nitrogen or other inert gas during a test procedure.

Moreover, it would be expected that a sensitive mass spectrometer instrument employing an electron multiplier could not be used to directly sample the ambient air atmosphere adjacent refrigeration equipment within a manufacturing plant. Such atmosphere contains moisture, hydrocarbon solvents and hydrocarbon sources such as the refrigerants and blowing agents referred to above. It would be expected that moisture would impair the function of the active components of the spectrometer within the detector chamber. The gain of the electron multiplier is known to be strongly dependent on the condition of its active surfaces and is susceptible to hydrocarbon contamination. Moreover, in the presence of large numbers of different molecular species within the detector chamber it would be expected to be difficult to resolve a selected mass peak. As a result, at any selected mass range, large detector currents would be expected to occur. At high gain levels, excessive electron multiplier output currents would be expected to cause saturation resulting in loss of multiplier sensitivity.

SUMMARY OF THE INVENTION

In the present invention it has now been found that a mass spectrometer may be employed to directly sample the ambient air in the vicinity of apparatus having a compressor-evaporator-condenser circuit within the manufacturing plant, employing an electron multiplier operating at high gain levels to amplify strongly the ion current. In the present invention, the detector chamber of the mass spectrometer is heat jacketed or is otherwise heated so that the chamber and active components therein including the ionizer and electron multiplier are maintained at substantially constant elevated temperature in the range about 60° to about 130° C. It has been found that this allows resolution of mass peaks distinctive of a halogenated hydrocarbon refrigerant compound and not exhibited by other halogenated compounds even where the concentration of the refrigerant compound is very low. As a result, it is possible to detect leaks having a leakage rate of a very low order of magnitude, such as about 1/1200 oz/year ($1.5 \times 10^{-7}$ std atm cc/sec) FREON-12, for example.

The reasons why maintaining the apparatus at stable elevated temperature enable the electron multiplier-equipped mass spectrometer to be operated at high gain levels are not as yet completely understood, but are believed to be linked to the tendency for gases, water molecules, and hydrocarbons to become absorbed on internal surfaces of the apparatus at ordinary room temperatures and to become desorbed at somewhat higher temperatures. It is believed that, firstly at elevated temperature there is inherently less tendency for molecules to become adsorbed on exposed surfaces of the ionizer, separation means, detector, electron multiplier or other components or on the inside walls of the detector chamber. Secondly, since the temperature is maintained substantially constant, it is believed there is no tendency for molecules to become adsorbed and subsequently desorbed when there is a rise in temperature, and as a result there is no tendency for the electron multipliers and detector to be swamped with the impact of large quantities of molecules or ions thereon.

As noted above, the substantially constant temperature at which the apparatus is maintained should be in the range about 60° to about 130° C. At temperatures significantly below about 60° C. it is difficult to operate at high gain levels without encountering difficulties of operation such as interference from adjacent mass peaks making it impossible to resolve a mass peak distinctive of the refrigerant. Some improvements in the resolution of desired mass peaks at high gain levels are obtained with increasing temperature, but operation at temperatures above about 130° C. does not appear to increase the level of gain which can be employed and risks rapid deterioration of heat-sensitive components such as plastic connector plugs and the like as well as being somewhat wasteful of energy. More preferably, the temperature of operation is in the range about 75° to about 115° C., still more preferably about 85° to 100° C.

In a further aspect, the present invention provides apparatus for carrying out the leakage testing method described above. The apparatus includes a gas sample inlet means for the mass spectrometer, comprising a metal capillary tube one end of which is connected to the detector chamber of the mass spectrometer through a flow restricting device such as a molecular leak. The opposite end of the tube is connected to a sample probe which comprises a terminal metal capillary tube sheathed in an electrically insulating sleeve having an end which extends beyond the end of the metal tube. The extending end of the sleeve is filled with a porous filter plug, for example of cotton wool. This arrangement provides for safety of the operators who must manipulate the probe adjacent the joints in the tubing of the refrigeration apparatus in order to test for leaks by guarding against stray electric potentials which may be induced in or applied to the metal capillary tubing, and the porous filter plug prevents ingress of liquids, dust or other solid particles into the capillary tube. This protects the pumps and electronic components of the mass spectrometer from damage or contamination, and avoids risk of plugging of the bore of the capillary tube. Preferably, the probe is removably connected to the first-mentioned or main capillary tube so that if the exposed end of the sleeve becomes worn or the filter plug becomes excessively contaminated the probe may be replaced.

Preferred embodiments of the present method and apparatus will be described in more detail by way of example only with reference to the accompanying drawings.

Figure 1:
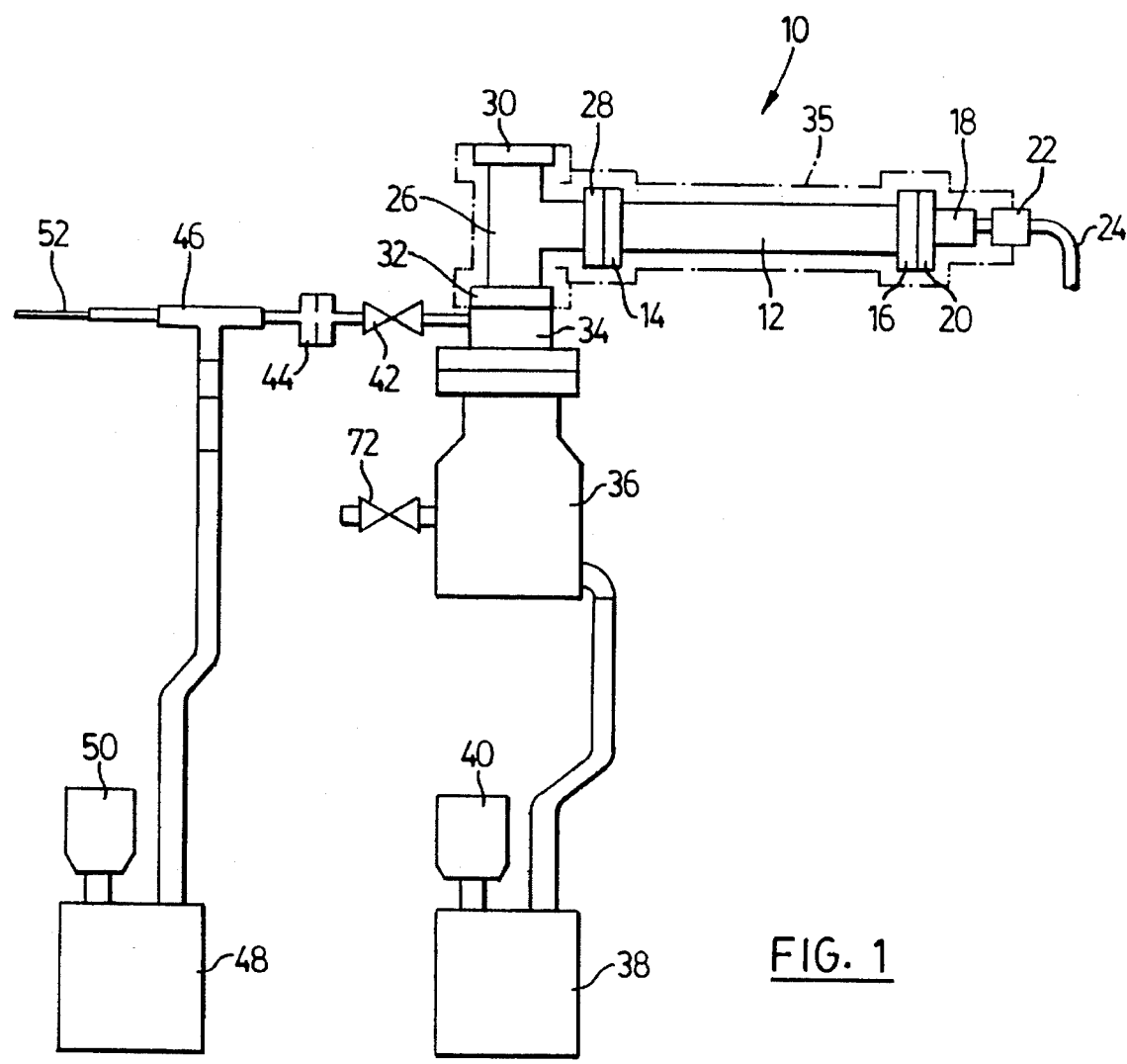
FIG. 1 shows somewhat schematically one form of mass spectrometer apparatus for use in carrying out the method of the invention.

Referring to the drawings, mass spectrometer apparatus 10 comprises an elongated detector chamber 12 having annular flanges 14 and 16 at opposite ends. Within the chamber 12 is an ionizer adjacent flange 14, and an ion detector comprising an electron multiplier supported adjacent flange 16. The ionizer ionizes molecules within the detector chamber and accelerates them toward the ion detector. The spectrometer 10 is provided with a mass analyzer which separates ions from the path between the ionizer and the ion detector so that only ions of a certain range of mass to charge ratio are discharged at the ion detector.

In the preferred form, the ions of selected mass range impact on the input stage of the electron multiplier. Each impinging ion expels several electrons from the struck surface. As will be well understood by those skilled in the art, in the operation of the electron multiplier, these electrons are driven by an electric field against another similar surface so that each of them gives rise to several electrons. After several stages of multiplication a significantly amplified pulse is obtained, which provides the signal which is the output from the spectrometer detector chamber.

The ionizer may be any of the several types known to those skilled in the art. For example it may be a field ionizer which operates by application of strong electrostatic field, a chemical ionizer which reacts the molecules with an ionized reagent gas, a photoionizer or a laser ionizer. Preferably, the ionizer is of the electron bombardment type wherein the gas molecules of the residual atmosphere within the detector chamber are given electrical charges by bombarding them with electrons derived from a heated filament.

The mass analyzer may again be any of several kinds known to those skilled in the art. For example, it may comprise means for subjecting ions travelling along the path from the ionizer to the ion detector to a magnetic field extending transversely of the path, which causes the ions to follow curved paths of radii proportional to their mass to charge ratios. Other examples of analyzer means that may be employed include analyzers employing combinations of electrostatic fields, for example double focusing and cycloidal focusing devices, or crossed alternating electrical fields, for example an electrostatic quadrupole filter. Still additional means that may be employed include omegatron, radio frequency and cyclotron resonance devices. Preferably the mass analyzer is an electrostatic quadrupole filter mounted internally of the detector chamber.

A head 18 is connected on the flange 16 through an annular flange 20. Mounted on the head 18 is a conenctor 22 for a cable or cables 24 which power the ionizer and electron multiplier and the mass analyzer, if mounted internally of the detector chamber. It also includes leads connecting to processing and display equipment whereby the signal from the electron multiplier may be processed and displayed.

Figure 2:
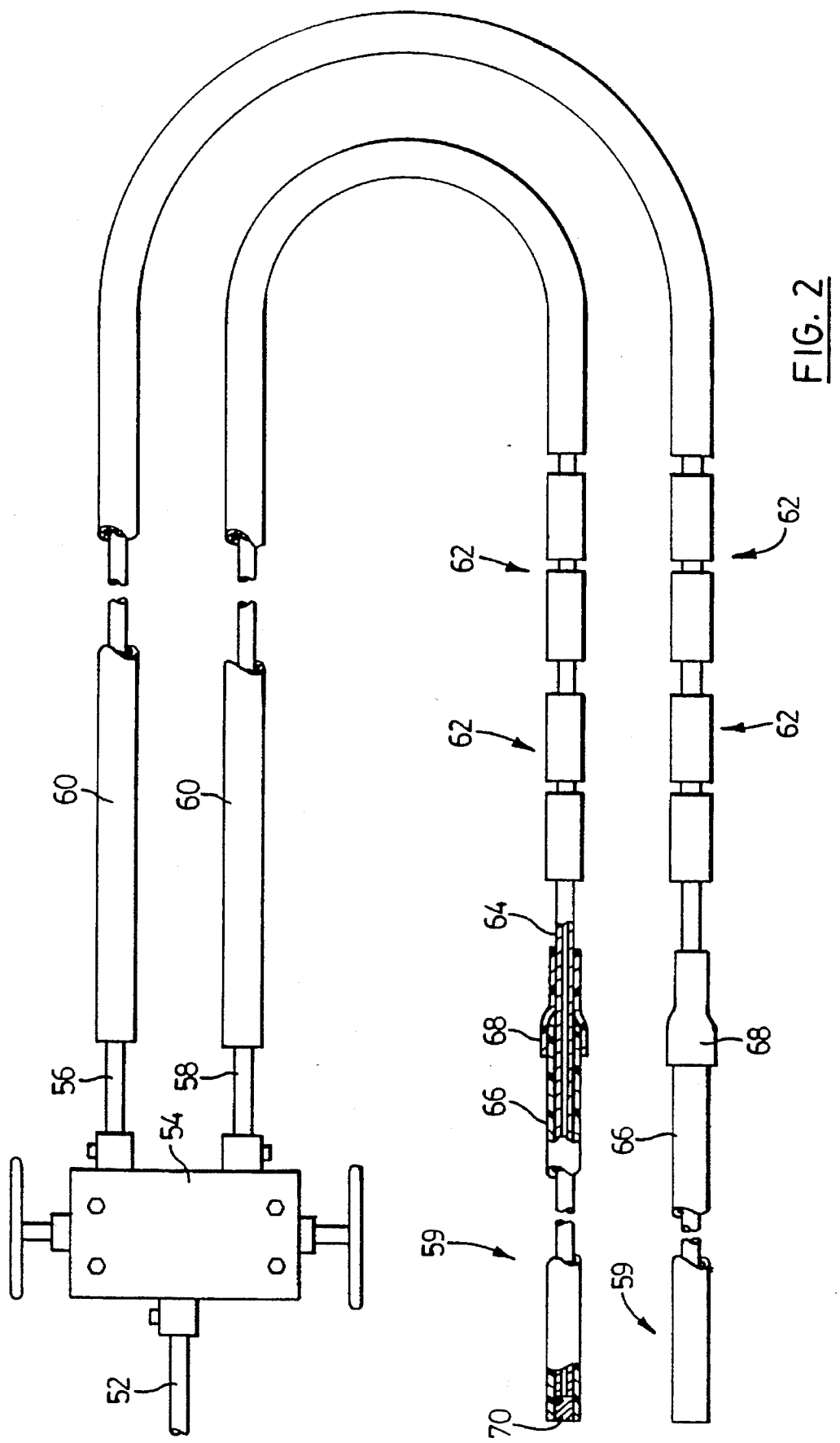
FIG. 2 is a partial plan view, partially in section, of sample inlet apparatus for use with the apparatus of FIG. 1.

Connected to the flange 14 are means for evacuating the detector chamber 12 and for introducing into the chamber a gas sample to be analyzed. These means comprise a tee fitting 26, having a lateral flange 28 connected to the flange 14, an upper flange 30 which is blanked off and sealed with a closure disk (not shown) and a lower flange 32 connected to an entry chamber 34. The casing of the detector chamber 12, the head 18 and preferably also the tee 26 are jacketed with a heating jacket 35 which maintains the apparatus at substantially constant temperature. Preferably, the heating jacket is electrically resistively heated and is equipped with a thermocouple connected to a settable responder which connects the heating jacket 35 to a source of electric current when the temperature sensed by the thermocouple drops by a small value (preferably less than 1° C.) below the pre-set temperature, which is the most preferred form is about 85° C., and disconnects the jacket 35 from the source when the temperature rises a small amount (preferably less than 1° C.) above the pre-set temperature. The lower end of the chamber 34 is connected to a turbomolecular or diffusion pump 36 connected to and backed by a rotary vacuum pump 38 having a smoke eliminator exhaust 40. The entry chamber 34 is connected through a valve 42 and a flow restricting device 44, such as a molecular leak, to a sample tee 46 the lateral limb of which is connected to a vacuum pump 48 also equipped with a smoke eliminator exhaust 50. Usually, the pumps 36, 38 and 48 maintain the detector chamber 12 at a pressure in the range about $10^{-4}$ to about $10^{-9}$ torr, more usually about $10^{-5}$ to about $10^{-8}$ torr. The tee 46 also connects to a metal capillary tube 52. Preferably, all capillary tubing used in association with the mass spectrometer is metal, more preferably stainless steel because other materials especially plastics retain halogen compounds which make the instrument respond after a source of leakage has been removed. As seen in FIG. 2, the capillary 52 connects to a valve 54 whereby one or both of two capillaries 56 and 58 may be connected to capillary 52. Normally both capillaries 56 and 58 are in use so that two operators may test refrigeration or like equipment as it passes by them on a continuous production line, each operator testing a different portion of the equipment by applying a probe 59 to the soldered or brazed joints in the compressor-evaporator-condenser circuit. Preferably, each capillary 56 and 58 is sheathed in electrically insulative plastic sheathing 60 which may be, for example polyethylene tubing. This sheathing protects the operators from stray potentials in the metal capillary tubing. Each capillary 56 and 58 connects, preferably through zero dead volume detachable connectors 62, (preferably high pressure liquid chromatography unions) to the probe 59 comprising a terminal length of capillary tube 64, again sheathed in an electrically insulative sheathing sleeve 66 similar to the sheath 60 and located on the tube 64 by a heat shrunk sleeve 68. One end of the sleeve 66 extends beyond the end of the length of capillary 64 a short distance, and this portion of the sleeve 66 is filled with a porous filter plug 70 for removing liquids, dust and other particulars. Preferably, the plug 70 is cotton wool. The connectors 62 may be uncoupled and the or each probe 59 replaced with a fresh probe when the end of the sleeve 66 becomes worn or the effectiveness of the filter plug 70 is impaired as a result of excessive liquid or solid particle contamination. Preferably, the length of the tubing between the entry chamber 34 and the valve 54 is short (less than about 12 inches) and the bore and lengths of the capillary tubing 52, 56, 58 and 64 are selected so that there is a quick response of the instrument firstly when either of the probes 59 is exposed to a source of leakage and secondly when, after such exposure, the or each exposed probe 59 is removed from the source of leakage. In this manner, after a leak is detected while the probes 59 are being applied simultaneously to two different pieces of equipment, it is possible to quickly determine which is the defective piece by withdrawing one or the other probe. The defective equipment can then be marked so that it can be modified later on, for example by having its joints reconnected with a view to eliminating the leakage, and the testing of succeeding pieces of equipment passing along the production line can be then resumed without needing to halt production. It will be appreciated that more than two probes may be connected and used with one instrument in a similar manner.

In the preferred form, in order to maintain a quick response time, the total internal volume of the capillary tubing connected to the instrument is about 0.02 to about 0.15 cu. in. more preferably about 0.04 to about 0.11 cu. in. For example in one preferred form, each capillary tube 56 and 58 is about 10 feet long and has an inside diameter of 0.02 inches, making a total internal volume for the two tubes 56 and 58 of about 0.075 cu. inches. With capillary tubing having an outside diameter of 1/16th inch (0.0625 inch), so that the sleeve 66 has an inside diameter of about 0.0625 inch, preferably the distance by which the sleeve 66 extends beyond the end of the terminal capillary piece 64 is about 0.1 to about 0.4 inches, more preferably about 5/32 in. to about 5/16 in. (0.16 to 0.31 inches). If the length of the plug 70 is too short there may be insufficient filtering action to adequately protect the instrument while if it is too long the response time of the instrument is adversely affected.

In order to maintain the sensitivity of the instrument the apparatus should be kept under vacuum continuously with the pumps 36, 38 and 48 operating 24 hours a day. In order to recover quickly from power failure, any device which vents the detector chamber to the atmosphere on shut down should be sealed off. For example usually the turbomolecular pump 36 as obtained from the supplier is provided with an electrically operated normally-open valve 72 which remains closed under electrical power and opens on power failure to admit air to the pump 36. Preferably, the valve 72 is disabled, for example by plugging the port through which the valve communicates with the atmosphere with a plastic plug or the like.

In use, a sample of the atmosphere to which the probes 59 are exposed is drawn continuously to the instrument and is provided at low pressure in the tee fitting 26 and detector chamber 12. The instrument may be calibrated by exposing it to a predetermined leakage of the refrigerant, provided for example from a cylinder of the same, observing the mass spectrum, comparing the spectrum with that exhibited by the normal ambient atmosphere including halogenated blowing agents and the like and determining a mass peak which is distinctive of the refrigerant and not exhibited by the blowing agent and other contaminants in the ambient atmosphere. Usually, the ionization of the refrigerant is accompanied by fragmentation, so that the mass spectrum is that of various fragments.

In the preferred form, the mass spectrometer is adjusted so that it scans a mass range adjacent to the peak of highest mass number which is distinctive of the refrigerant and is not exhibited by the background contaminants. This reduces the risk of interference from smoke, solvents or other contaminant molecules. For example the refrigerant dichlorodifluoromethane (trademark FREON-12) usually provides the highest mass number peak at about 85 atomic mass units (AMU) corresponding to the ion of the fragment $CClF_2$ and this can be used to distinguish over a typical blowing agent trichlorofluoromethane ($CCl_3F$, trade-mark FREON-11) which provides no ion fragment of the same mass.

In one mode of operation, the instrument may be set to scan a few mass units, for example 5, 10 or 20 AMU on each side of the AMU number of the peak of interest. The output from the ion detector may be displayed on a cathode ray tube or similar video display device as a plot of signal amplitude against AMU. This plot may be compared with the corresponding plot obtained from sampling the ambient atmosphere in the absence of refrigerant and an output indicating a predetermined amplitude of signal at the AMU number of the peak of interest indicates a leakage. Such comparison, and the generation of an audible or visible alarm when a leakage condition exists, may of course be carried out automatically by electronic data processing means.

In a preferred mode of operation, as closely as is permitted by the prevailing resolution power, the maximum amplitude of the signal substantially at the mass number of the peak of interest is monitored and an alarm, preferably a buzzer, electronic tone generator or other audible alarm is actuated when the maximum amplitude of the peak reaches a given value. For example, the signal from the ion detector may be applied to a load thereby generating a voltage which is supplied to a voltage comparator which actuates an amplifier when a voltage corresponding to a preset signal amplitude is supplied. The amplifier drives a speaker providing an audible alarm. A visual alarm such as a flashing light or the like may also be used.

It has been found that increased sensitivity for the instrument can be obtained by operating with reduced resolution power. The resolution power at a peak of given mass number may be defined by reference to the pass band width expressed in AMU. Since the number of ions passed by the mass analyzer and detected at the ion detector falls off gradually as the edge of the pass band is approached, it is convenient to measure the pass band width at the point where the signal falls to one half the maximum value.

Figure 3:
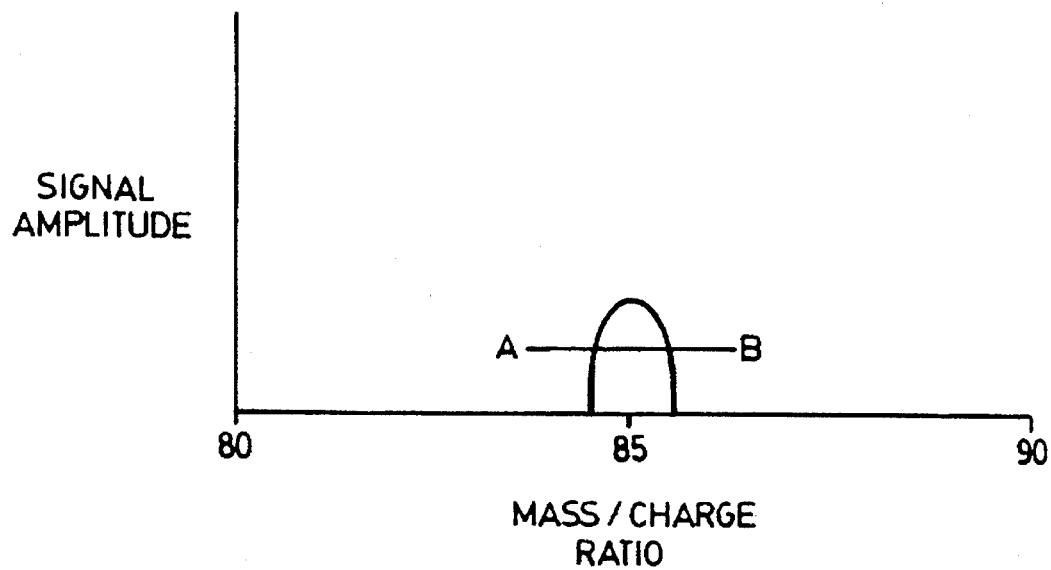
FIGS. 3 and 4 are plots of signal amplitude against mass/charge ratios at high and low selectivities, respectively.
Figure 4:
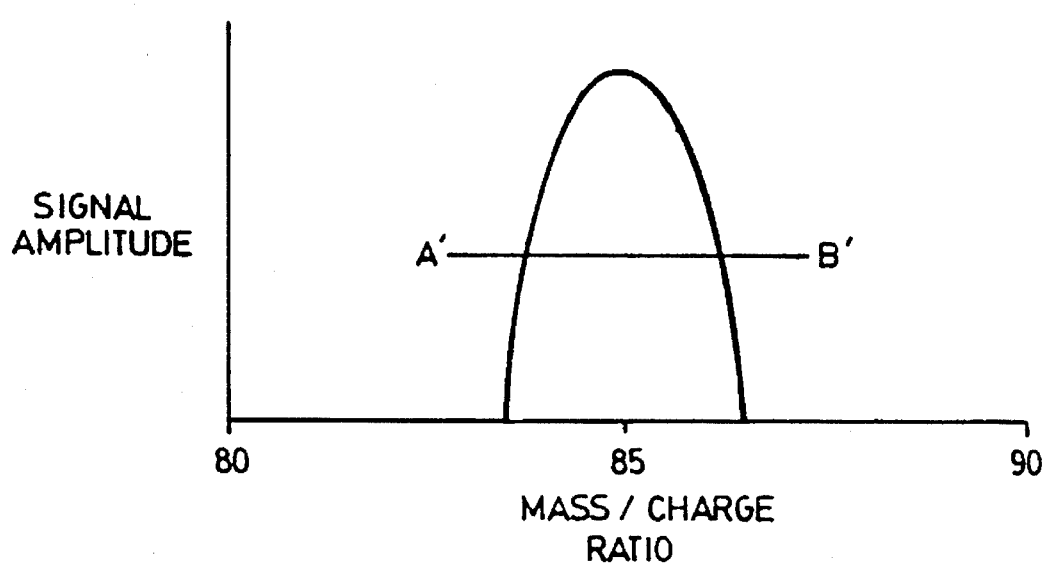

FIG. 3, for example, shows the cathode ray tube display of ion detector signal (ion current) versus AMU when the instrument is exposed to a given concentration of FREON-12. In this case the instrument is set to a mass peak width of about one AMU. That is to say the pass band width at the line AB drawn at half the peak height is about one AMU. FIG. 4, drawn to the same scale as FIG. 3 shows the display when the instrument is exposed to the same concentration of FREON-12 but the resolution of the instrument has been adjusted so that the pass band width at A'B' (half the maximum peak height) is about 2 to 3 AMU. It will be noted that the amplitude of the maximum signal is greatly increased by operating at reduced resolving power. Where, as in the preferred form the mass analyzer is a quadrupole filter the pass band width is adjusted by adjusting the ratio of the amplitudes of the radio frequency and the direct current voltages applied to the quadrupoles.

In the event there is no one mass peak exhibited by the refrigerant and not by the blowing agent or other background contaminants, or there is otherwise a conflict between the masses of ions and fragments derived from the refrigerant with those from background contaminants, the mass spectrum including the fragmentation pattern of the refrigerant may be obtained or displayed, or at least a part of the spectrum yielding sufficient of the fragmentation pattern of the refrigerant to distinguish from background contaminants may be examined, whereby an indication of leakage of the refrigerant is obtained.

In all cases, the gain of the electron multiplier is set at the highest level possible while still allowing resolution of the peak or peaks of interest free from interference from adjacent peaks. As discussed above it is found that the heat jacketing allows the gain level to be set much higher than would otherwise be possible without the output from the instrument showing swamping of the peaks of interest by adjacent peaks. In this manner, extremely low rates of leakage of refrigerants can be detected.

The nature and structure of, and the mode of operation of, electronic control means and of electronic data processing means which may be associated with the instrument to perform the operations described above are well known to those skilled in the art and need not be described in detail herein. Such control and data processing means may for example control the mass analyzer to scan a given mass range, and measure, record and display the amplitudes of the ion detector signals in a manner indicative of relative or absolute abundancies of all mass peaks detected or of those of selected mass or masses. In addition, such means may monitor the amplitude of the peaks or ion currents at a selected mass number or mass numbers and actuate an audible or other alarm when the mass peak exceeds a preset level. Further, such means may be programmed to recognise a given fragmentation pattern and actuate an alarm when a mass spectrum including the fragmentation pattern is desired.

The apparatus and methods described above are adapted to detect small leakages of various refrigerants such as, for example, dichlorodifluoromethane, 1,1-difluoroethane, 1,1,1,2-tetrafluoroethane, chlorodifluoromethane, 1-chloro-1,2,2,2-tetrafluoroethane and mixtures thereof. The blowing agents which may be used and which the above apparatus and methods are capable of distinguishing over include, for example, trichlorofluoromethane, 1,1-dichloro-2,2,2-trifluoroethane, 1,1-dichlorofluoroethane, perfluoropentane ($C_5F_{12}$), perofluorohexane ($C_6F_{14}$) and mixtures thereof.

Various forms of commercially available mass spectrometry apparatus, modified in accordance with the present invention, may be used to perform the above functions. For example an IPC-50 mobile sampling system and Quadrex 200 (trade-mark) residual gas analyzer, available from Inficon Leybold-Heracus Inc., East Syracuse, N.Y., may be employed, modified as described above with reference to FIGS. 1 to 4.

In one example of the present method and apparatus, the IPC-50 and Qudrex 200 Inficon apparatus was employed, modified as described above. The instrument was adjusted to provide an electron multiplier voltage of 1.58 kv and an electronic gain of $6 \times 10^{-12}$ amps.

The peak width adjustment was set so that the width of the peak measured at one-half of the maximum height at about 85 AMU when the instrument was exposed to a small leakage of FREON-12 was about 2.4 AMU. The heating jacket was maintained at a temperature of about 85° C. With this arrangement, when applied to testing refrigeration equipment and similar equipment having a compressor-evaporator-condenser circuit, detection of leaks of FREON-12 as small as $1.5 \times 10^{-7}$ std. atm cc/sec to $9 \times 10^{-7}$ std atm cc/sec (about 1/1200 oz/yr to about 1/200 oz/yr) were readily possible, and large leaks of several ounces per year could be detected by adjusting the gain of the instrument.

I claim:

1. Apparatus for detection of leakage of halogenated hydrocarbon refrigerant gas from a compressor-evaporator-condenser circuit, comprising: a mass spectrometer having an elongated detector chamber, means for evacuating said detector chamber, an ionizer at one end of said chamber, an ion detector comprising an electron multiplier at an opposite end of said chamber, means for accelerating ions along a path from said ionizer toward said ion detector, and means for separating ions from said path according to mass to charge ratio whereby ions of a predetermined mass range are incident on said ion detector and a signal is generated proportional to the rate of incidence of ions on said detector; and halogenated hydrocarbon gas sample inlet means for said mass spectrometer comprising a flow restricting device connecting said chamber to one end of a tube formed of material substantially non-retentive of halogenated hydrocarbon and having a fine uniform diameter capillary bore such that a 10 feet length thereof has a total internal volume of 0.02 to 0.15 cu. in., an opposite end of the tube connected removably to a sample probe having a bore in communication with said capillary bore, said bore of the sample probe having a porous filter plug therein adapted to retain liquid and particulates and directly intake ambient atmosphere adjacent said compressor-evaporator-condenser circuit.

2. Apparatus according to claim 1 wherein said porous plug comprises cotton wool.

3. Apparatus as claimed in claim 1 wherein said volume is 0.04 to 0.11 cu. in.

4. Apparatus as claimed in claim 1 wherein at least an outer surface portion of the sample probe is of electrically insulating material.

5. Apparatus as claimed in claim 4 wherein said electrically insulating material is synthetic plastic resin.

6. Apparatus as claimed in claim 1 wherein said tube is of metal.

7. Apparatus as claimed in claim 1 including at least two sample probes each having said porous filter plug in each sample bore, and each said sample probe having a tube of material substantially non-retentive of halogenated hydrocarbon connecting each tube through said flow restricting device to said chamber of said mass spectrometer, each tube having said fine uniform diameter capillary bore such that a 10 feet length thereof has a total internal volume of about 0.02 to 0.15 cu. in.

* * * * *